July 23, 1957     J. T. CLARKE     2,800,445
ANIONIC PERMSELECTIVE MEMBRANE
Filed April 24, 1952
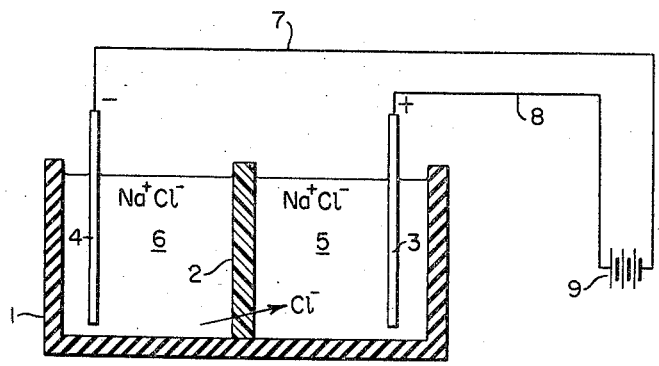
INVENTOR.
JOHN THACHER CLARKE
BY
ATTORNEYS

United States Patent Office 2,800,445
Patented July 23, 1957

2,800,445

ANIONIC PERMSELECTIVE MEMBRANE

John Thacher Clarke, Newton Highlands, Mass., assignor to Ionics, Incorporated, Cambridge, Mass., a corporation of Massachusetts Application April 24, 1952, Serial No. 284,078

11 Claims. (Cl. 204—180)

This invention relates to synthetic organic anion exchange materials comprising the quaternization products of haloalkylated aromatic vinyl polymers. It has for its primary object the preparation of these materials as selectively permeable and electrically conductive solid structures of predetermined form.

The structures of this invention are solid solvated gels which have as a skeletal structure an insoluble infusible polymeric matrix that includes vinyl aromatic groups with dissociable quaternary ammonium groups bonded to the aromatic nuclei. The presence of the quaternary ammonium groups distributed throughout the matrix on the aromatic nuclei, imparts to these structures a fixed cationic charge electrostatically associated with a mobile replaceable anion. Thus, when the quaternary ammonium groups are dissociated as occurs when the solvating liquid is water and the structure is a hydrous gel, these materials exhibit ion exchange characteristics. Moreover, because a fixed positive charge is retained by the matrix throughout the gel, anions may be readily caused to permeate these structures while cations are repelled by the like charge of the matrix. These materials are accordingly electrically conductive, and selectively permeable to anions.

In addition to these electrical properties, the materials of the present invention are mechanically durable and substantially hydraulically impermeable and may thus be formed into self-sustaining structures which may be used as hydraulic separators. The properties of the materials of this invention render them particularly useful in the field of electrodialysis wherein they separate solutions between which anions are to be transferred to the substantial exclusion of cations.

In general, the process of the present invention consists first in forming a solid solvated gel structure which is coherent, homogeneous and of predetermined dimensions and which comprises a cross-linked polymeric matrix having aromatic nuclei and a continuous liquid phase in gel relationship with the matrix. The gel structure is thereafter haloalkylated, then treated with a tertiary aliphatic amine to incorporate dissociable quaternary ammonium groups on the aromatic nuclei.

The gel structure is formed by dissolving in a suitable solvent, material polymerizable to a solid cross-linked structure having vinyl aromatic nuclei, disposing the solution to the desired form, and then effecting polymerization under conditions preventive of the evaporation of solvent. The polymerizable ingredients thus polymerize while in solution to a cross-linked insoluble matrix which uniformly permeates the mass of the solution and occludes the solvent as the liquid phase of a coherent homogeneous gel. The polymeric matrix is thus formed to accommodate the liquid phase and is not swollen by it resulting in a highly solvated gel having an unstressed solid matrix. The volume of the solvent has been found to determine or fix the equilibrium liquid volume of the gel structure. That is, the gel retains about the same volume of liquid when one liquid is displaced by another, or when it is partially dried and resolvated. It has further been observed that the solid gel structure is subject to shrinkage when solvent is removed from it, as by evaporation, which indicates a non-rigid structure having limited extensibility.

The prevention of evaporation of solvent during polymerization is an important feature of this invention; it makes it possible to produce a continuous homogeneous product having the desired characteristics of mechanical and hydraulic stability. In the processes of the prior art, wherein polymerization is not effected in the presence of a solvent or wherein the solvent if present is permitted to evaporate, the polymers consist either of vitreous nonpermeable structures characteristic of molding resins, or of fractured particulate structures characteristic of ordinary granular ion exchange resins. Polymeric structures which are not formed in the presence of a solvent, may be solvated to some extent, by immersing them in a solvating liquid, but the result is to subject the polymeric structures to severe swelling stresses which seriously impair their mechanical strength, frequently to the point of causing fracturing of the structure. The structures of the present invention are not subject to these stresses.

The polymerizable materials from which the gel is formed are aromatic vinyl compounds polymerizable to a three dimensioned cross-linked matrix. Cross-linking may be provided by the aromatic vinyl compound itself, or by materials copolymerizable therewith to form cross links between polymeric chains of the aromatic vinyl compound. For instance, the polymeric matrix may be formed of a divinyl benzene polymer (or other polymers of a polyvinyl aromatic compound), which because of the pair of vinyl groups on the monomeric molecule, is a cross-linked structure, or it may be formed of aromatic compounds having a single vinyl group, such as styrene, copolymerized with a cross-linking material such as divinyl benzene (or other polyvinyl aromatic compound). When divinyl benzene is used as a cross-linking material satisfactory results are attained when it is included with a monovinyl aromatic compound, such as styrene, ethylstyrene or other derivatives thereof, to the extent of 20 mol percent based on total polymerizable ingredients, but preferred embodiments include higher proportions, even up to 100 percent, of divinyl benzene. There may also be included with the vinyl aromatic compounds limited amounts of vinyl aliphatic materials copolymerizable therewith, e. g. butadiene, alkyl acrylate esters and acrylate esters, acrylonitrile, vinyl halides, methyl vinyl sulfide, but their presence inherently reduces the concentration of aromatic nuclei susceptible to haloalkylation and quaternization, and tends to result in a lower ion exchange capacity.

A solid gel structure is formed by dissolving the polymerizable materials along with a suitable catalyst in from 20–70% of a solvent (by volume on total volume) and then effecting polymerization of the dissolved material under conditions which prevent the escape of solvent by evaporation. Polymerization is effected by any suitable expedient such as heat, light or pressure and is continued until a water-insoluble, infusible, solvated gel is formed. In the preferred embodiment utilizing divinylbenzene alone or in conjunction with a monovinyl aromatic compound such as styrene or ethylstyrene, suitable solvents include benzene, toluene, dichlorodiethylether or other solvents and the most satisfactory results are obtained when the solvent is present to the extent of about 50% by volume. However, as already indicated, as little as 20% solvent or as much as 70% has been found satisfactory.

Membrane structures produced in accordance with this invention are advantageously formed to embed a reinforcing sheet material or web in order to increase the mechanical strength and tear resistance of the membranes. Suitable reinforcing materials include in general woven or felted sheet materials such as glass filter cloth, polyvinylidene chloride screen, glass paper, treated cellulose paper, polyvinyl chloride battery paper, and fiber mats of polystyrene coated glass fibers, and similar porous materials of appreciable strength. In forming a reinforced membrane a suitable technique is to place the reinforcing sheet on a flat casting surface, pour the solution of polymerizable ingredients onto the casting surface embedding the reinforcing sheet, then placing a second flat surface over the cast to prevent evaporation of solvent, and heating the solution to cause polymerization. The cured cast is then leached with a non-aromatic solvent in order to remove the bulk of the non-polymerized aromatic material and to replace the solvent of polymerization with a solvent inert to haloalkylation.

The gel structure is haloalkylated by treating it with well known haloalkylating agents. Apparently, the continuous liquid phase throughout the gel makes it possible to treat the structure with a haloalkylating agent and obtain substantially uniform haloalkylation throughout the structure. One preferred method of haloalkylation comprises chloromethylation by immersing the polymerized gel in chloromethylether in which is dissolved a suitable Friedel Crafts catalyst such as aluminum chloride or stannic chloride. This may be done at room temperature and requires about an hour or more to treat a membrane of about 1 millimeter in thickness. About 70% of the aromatic groups are chloromethylated by this procedure. It will be understood, that the requisite time of immersion depends largely on the shape and size of the article and may, accordingly, be considerably longer. Chloromethylation results in the bonding of chloromethyl groups to the aromatic nuclei according to the equation:

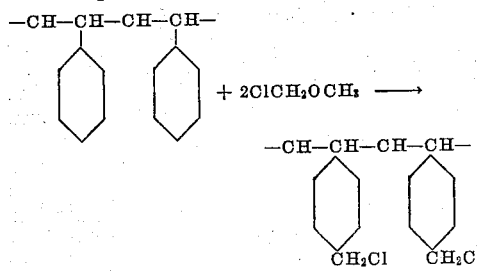

The final step in the process comprises the treatment of the haloalkylated gel structure with a tertiary amine to form quaternary ammonium chloride groups from the haloalkyl groups according to the typical reaction:

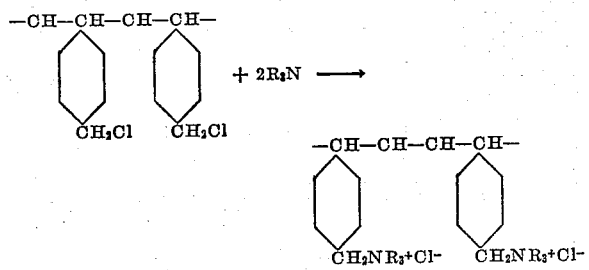

where R represents alkyl or alkylol functions. The quaternary ammonium halide groups are highly dissociable into a positively charged radical bonded to the aromatic nucleic, and hence, fixed to the polymeric structure, and a negatively charged free mobile halide ion in electrostatic association with the positive charges of the polymeric matrix. Quaternization is conveniently carried out by immersing the haloalkylated gel structure in a solution of a tertiary amine, for instance it may be immersed in a 25% aqueous solution of trimethylamine. After quaternization, the gel structure is washed with water to remove unused reactants, and is ready for use. The gel structure when treated with water during quaternization is converted to the hydrous form, the water displacing the solvent previously present. A characteristic of the gel structures of this invention is that one solvating liquid may be replaced by others.

These structures in the hydrous chloride form have been found to have high electrical conductivity generally in excess of $5 \times 10^{-3}$ ohm$^{-1}$ cm.$^{-1}$. They are substantially selectively permeable to anions as indicated by the fact that in the standard concentration cell:

| calomel electrode. | sat'd KCl bridge. | 0.1 N KCl. | membrane. | 0.01 N KCl. | sat'd KCl bridge. | calomel electrode. |
|---|---|---|---|---|---|---| at 25° C., a characteristic concentration potential approaching the thermodynamic ideal of 55.1 millivolts may be measured.

The ion-exchange capacity of these materials is in excess of 0.3 milliequivalent per gram of dried material. Moreover, they are mechanically durable and possess hydraulic resistivities well in excess of $10^2$ atm. sec. cm.$^{-2}$ (the pressure in atmospheres required to cause liquid to permeate a centimeter cube of the material at the rate of 1 cc. per sec.).

Structures of any desired form or size may be made in accordance with this invention by casting or molding (including pressure molding) or otherwise forming a solution of the polymerizable monomers and effecting polymerization in the mold while preventing the evaporation or escape of substantial amounts of solvent, for instance, by closing the mold or by otherwise carrying out the polymerization under substantially saturated solvent condition. In this way, forms and structures may be obtained in far greater size than structures in which conventional ion-exchange materials have been made in the past. As shown in the prior Juda and McRae Patent No. 2,636,852 referred to hereinafter, such unfractured structures may be described as having at least two dimensions in excess of 0.25 inch. Of particular interest, is the fact that continuous hydraulically impermeable uniform sheets or membranes may be formed in accordance with this invention. Moreover, the molded article may be machined by conventional techniques.

The present invention and its objects, features and utility will be better understood from the following detailed description of preferred embodiments thereof and from the drawing showing a diagrammatic elevation in cross section of an electrodialytic cell containing a membrane produced in accordance with the invention.

The divinyl benzene used in the examples is the commercial grade which is obtainable under several concentration designations. The actual analysis of the grades used herein are given below:

TABLE I

| Designation | 20-25% DVB | 40-50% DVB | 50-60% DVB |
|---|---|---|---|
| | Percent by weight | Percent by weight | Percent by weight |
| Divinylbenzene | 17 | 47 | 51 |
| Ethylstyrene | 49 | 43 | 40 |
| Diethylbenzene | 34 | 10 | 8 |

*Example 1*

Divinylbenzene, commercial 40-50% grade __cc__ 48
Dichlorodiethyl ether _____cc__ 32
Benzoyl peroxide _____gram__ 0.25

The ingredients were mixed thoroughly at room temperature and cast between two glass plates 0.1 cm. apart on a reinforcing of glass fiber mat. The cast was then heated to 80° C. for 3 hours to form a membrane of a gel comprising a matrix of divinyl benzene-ethyl vinyl benzene copolymer and a liquid phase of dichlorodiethyl ether and diethyl benzene.

During polymerization, evaporation of solvent into the space between the plates beyond the area occupied by the cast occurred only at the edges of the cast. The dried edges sealed the interior of the cast from additional evaporation of solvent. The dried edges were trimmed off and discarded after polymerization and cooling of the cast membranes. The cast was then leached thoroughly in ethylene chloride.

The cast was thereafter immersed in a mixture of

| | Parts by weight |
|---|---|
| Chloromethyl ether | 30 |
| Aluminum chloride | 3 | for 20 hours at room temperature, then removed and surface-wiped. The chloromethylated membrane was converted to the quarternary ammonium salt by prompt immersion in a 25 percent aqueous solution of trimethylamine for four hours at room temperature.

The final membrane was pale yellow in color and physically strong. After thorough leaching in water its physical properties were determined. They are tabulated in Table II.

Example II

| | | |
|---|---|---|
| Divinylbenzene, commercial 20-25% grade, alkali | cc | 48 |
| Diethyl benzene | cc | 16 |
| Benzoyl peroxide | gram | 0.3 |

The ingredients were mixed thoroughly at room temperature and cast on a reinforcing mat 15 mils thick consisting of glass fibers coated and bonded with polystyrene. The cast was sandwiched between glass plates and heated to 90° C. for 4.5 hours to form a solid gel structure comprising a matrix of divinyl benzene-ethylvinyl benzene copolymer and a liquid phase of diethyl benzene.

During polymerization, evaporation of solvent into the space between the glass plates beyond the area occupied by the cast occurred only at the edges of the cast. The dried edges sealed the interior of the cast from additional evaporation of solvent. After the cast had cooled to about room temperature (25° C.) the dried edges were trimmed off and discarded. The cast membrane was thereafter leached repeatedly in ethylene chloride to remove unreacted monomeric materials and residual solvent.

The membrane was immersed in 4 times its weight of a mixture of

| | Parts by weight |
|---|---|
| Chloromethyl ether | 30 |
| Aluminum chloride | 3 | for two hours at room temperature. The chloromethylated membrane was then rinsed in water and immersed in a 25 percent aqueous solution of trimethylamine for two hours at room temperature, then rinsed with water and tested for its physical properties, reported in Table II.

It was observed that when the membrane of this example was rinsed with water immediately after chloromethylation there developed what appeared to be minute cracks. During the subsequent quaternization, however, this affect disappeared entirely and the final membrane was entirely free of cracks.

Example III

| | | |
|---|---|---|
| Divinylbenzene, commercial 20-25% grade | cc | 39 |
| Styrene | cc | 19 |
| Diethylbenzene | cc | 42 |
| Benzoyl peroxide | gram | 0.5 |

The ingredients were mixed thoroughly, cast cured, chloromethylated and quaternized as described in Example II. The properties of the membrane are reported in Table II.

Example IV

| | | |
|---|---|---|
| Divinylbenzene, commercial 50-60% grade | cc | 36 |
| Styrene | cc | 24 |
| Toluene | cc | 40 |
| Benzoyl peroxide | gram | 0.5 |

The ingredients were mixed thoroughly cast, cured and chloromethylated as described in Example II. The chloromethylated membrane was immersed for 4 hours in a 20% aqueous solution of dimethylethanol-amine at room temperature, then washed with water. Its physical properties are reported in Table II.

TABLE II

| Example | 1 | 2 | 3 | 4 |
|---|---|---|---|---|
| Conductivity, ohm$^{-1}$ cm$^{-1}$ | 9.1×10$^{-3}$ | 11.8×10$^{-3}$ | 18.2×10$^{-3}$ | 6.7×10$^{-3}$ |
| Capacity, meq./wet gram | 1.04 | 1.00 | 1.75 | 1.17 |
| Concentration, e. m. f., mv | 9 | 11.5 | 10.5 | 10.5 |
| Water content, percent by wt | | 50 | 61 | 53 |
| Swelling ratio | | −2% | −8% | |

The ion exchange capacity was determined by bringing a speciment of the membrane into equilibrium with a 1.0 N sodium chloride solution, then leaching it repeatedly in distilled water to remove the excess sodium chloride. The specimen was then soaked in a 1.0 N sodium nitrate solution, thereby replacing the chloride ions with nitrate ions and this solution was titrated for removed chloride. The capacity is expressed as the number of milliequivalents of chloride removed by the nitrate per gram of surface dried material.

The electrical conductivity was measured by forming a strip in the leached chloride form 10 cm. long, 1 cm. wide and 0.1 cm. thick, clamping the ends to copper electrodes and measuring the resistance of the strip to 60 cycle alternating current. The conductivity is the reciprocal of the resistance.

The concentration potential was measured in a concencentration cell with a specimen of the membrane separating a 0.60 N aqueous sodium chloride solution and a 0.30 N aqueous sodium chloride solution. The electrodes were saturated calomel electrodes connected to the sodium chloride solution by means of saturated potassium chloride salt bridges. The membrane was brought into equilibrium with a 0.60 N aqueous sodium chloride solution prior to its insertion in the cell. The respective solutions in the cell were continuously renewed to maintain their concentrations. The value recorded is the absolute value of the open circuit potential after steady conditions were attained. In such a cell, the absolute value of the thermodynamically ideal potential is 17 mv. It will be seen that this standard was approached. The swelling ratio is defined as the relative change in volume when the membrane is passed from water to a saturated aqueous sodium chloride solution.

In the examples, divinyl benzene is the preferred polyvinyl aromatic compound used in conjunction with styrene and/or ethylstyrene. It will be understood from the foregoing, however, and from the nature of the chemical reactions involved during haloalkylation and quaternization, that membrane structures in accordance with the present invention, may be made from a great number of polymerizable aromatic vinyl compounds for example the polymerizable aromatic vinyl hydrocarbons and derivatives thereof, provided there is present, an amount of polymerizable polyvinyl compound in excess of 20 mol percent. In other words, the matrix must be suitably crosslinked and must also contain aromatic nuclei which may be haloalkylated and subsequently quaternized. Other polyvinyl aromatic compounds which may be used for cross linking include divinyl toluene, divinyl naphthalene, divinyl diphenyl, divinyl-phenyl vinyl ethers and the substituted alkyl derivatives thereof such as dimethyl divinyl benzene and similar polymerizable aromatic compounds which are polyfunctional in vinyl groups. Other monovinyl aromatic compounds copolymerizable therewith include vinyl toluene, vinyl ethylbenzene, vinyl halobenzenes, alpha methyl styrene and generally the other alpha- and nuclearly-substituted alkyl derivatives of styrene. Preferably, since the para nuclear position is most readily haloalkylated, the polymerizable compounds, both the polyvinyl and the monovinyl, are selected to produce a polymer or copolymer having free para positions.

Haloalkylation can be performed with haloalkylating agents other than chloromethyl ether, such as other haloalkyl ethers of the general formula

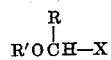

(where R is hydrogen or an alkyl group preferably no higher than propyl, R' is an alkyl group preferably no higher than propyl, and X represents chlorine, bromine or iodine), and mixtures of hydrogen halides and aliphatic aldehydes e. g. $HBr + CH_3CHO$ (in the presence of methylalcohol). Similarly, quaternization may be performed with a great number of aliphatic or alicyclic tertiary amines, including tripropylamine, ethylpropylisobutylamine; dimethylaniline, methyl ethylaniline and other dialkyl anilines; dimethyl toluidine; pyridine; quinoline; 2-methylquinoline; methyltetrahydroquinoline; triiso amylamine, to name but a representative few, dissolved in a polar solvent such as water or lower aliphatic alcohols.

In the examples the benzoyl peroxide was included to catalyze the polymerization. Other suitable catalysts are 2-azo bis isobutyro nitrile, and other catalysts for free radical polymerizations, and boron trifluoride and other catalysts for polymerization by the ionic mechanism.

A simple electrodialysis cell utilizing a membrane of the present invention is shown in the drawing. It consists of a container 1 separated into compartments 5 and 6 by a membrane 2 prepared in accordance with any of the foregoing examples. A graphite anode 3 is situated in compartment 5 and a graphite cathode 4 is situated in compartment 6. Power leads 7 and 8 connect these electrodes 3 and 4 with a source of voltage, for example, a D. C. battery 9. The compartments 5 and 6 each contain an electrolytic solution of 0.03 N sodium chloride. It is found that the current passing between the electrodes 3 and 4 is carried across the membrane 2 almost exclusively by chloride ions migrating from compartment 6 into compartment 5. In this apparatus, the membrane 2 provides a barrier which makes it possible to transfer chloride ions from one solution to another to the substantial exclusion of cation transfer. Representative processes and apparatus in which the membranes of this invention may be advantageously utilized, are described in the following copending applications: Walter Juda and Wayne A. McRae, Ser. No. 146,706, filed Feb. 28, 1950, Patent No. 2,636,852, issued April 28, 1953, Walter Juda and Wayne A. McRae, Ser. No. 207,289, filed Jan. 23, 1951, now Patent No. 2,767,135, Davis R. Dewey II and Edwin R. Gilliland, Ser. No. 213,514, filed March 2, 1951, now Patent No. 2,741,591.

Having thus disclosed my invention, I claim and desire to secure by Letters Patent:

1. The method of forming a solid unfractured electrically conductive anion-permeable structure in the form of a membrane comprising as an essential part extending substantially throughout said structure a quaternization polymerizate of polyvinyl and monovinyl aromatic compounds, comprising: the steps of dissolving at least one polyvinyl aromatic compound and at least one monovinyl aromatic compound in at least 20 percent by volume on total volume of inert organic solvent, said polyvinyl aromatic compound being at least 20 mol percent of the total polymerizable ingredients, casting said solution to a membrane form, polymerizing the mass to the insoluble, infusible stage under conditions substantially preventive of the escape of solvent to form a coherent uniform gel structure, haloalkylating the gel and treating the haloalkylated gel with a tertiary amine while retaining substantially the same solvent concentration.

2. The method defined by claim 1 wherein the solution of polymerizable material contains about 50 percent of solvent.

3. The method of forming a solid unfractured, electrically conductive anion-permeable structure in the form of a membrane comprising as an essential part extending substantially throughout said structure a quaternization polymerization product of polyvinyl-monovinyl aromatic compounds, comprising: the steps of dissolving at least one polyvinyl aromatic compound of the group consisting of divinyl benzene, divinyl toluenes, divinyl naphthalenes, divinyl diphenyls, divenyl-phenyl ethers and the substituted alkyl derivatives thereof, having at least 20 mol. percent of polymerizable polyvinyl aromatic nuclei therein, in from 20 to 70 percent of a solvent of the group consisting of benzene, toluene, dichlorodiethyl ether and diethyl benzene, by volume on total volume, casting said solution with a reinforcing material therein to a membrane or sheet form, polymerizing the mass under conditions substantially preventive of the escape of solvent to form a solid coherent uniform gel, haloalkylating the gel and treating the haloalkylated gel with a tertiary aliphatic amine while retaining substantially the same solvent concentration.

4. The method of forming a solid anion-permeable unfractured structure of quaternization products of haloalkylated aromatic vinyl compounds, said structure having at least two dimensions in excess of 0.25 inch comprising: the steps of dissolving at least one aromatic compound of the group consisting of polymerizable polyvinyl aromatic hydrocarbons and the substituted alkyl and halo derivatives thereof, and at least one aromatic compound of the group consisting of polymerizable monovinyl aromatic hydrocarbons and the substituted alkyl and halo derivatives thereof, in the proportion of 20–100 mol percent polyvinyl aromatic hydrocarbons, in from 20–70 percent of a liquid which is a solvent for said vinyl aromatic compounds, by volume on total solution, casting said solution with a reinforcing material therein to a membrane form having at least two dimensions in excess of 0.25 inch, polymerizing the solute under conditions preventive of the substantial escape of solvent to form a solid coherent uniform gel, haloalkylating the gel and treating the haloalkylated gel with a tertiary aliphatic amine to form quaternary ammonium groups from the haloalkyl group while retaining substantially the same solvent concentration, and saturating the quaternizated structure with water.

5. The method defined by claim 4 wherein the solution of polymerizable material contains about 50 percent solvent.

6. The method of forming a solid anion-permeable unfractured structure of quaternization products of haloalkylated aromatic vinyl compounds, said structure having at least two dimensions in excess of 0.25 inch comprising: dissolving divinyl benzene and at least one compound of the group consisting of styrene and the alpha substituted alkyl derivatives thereof, in the proportion of 20–100 mol percent divinyl benzene, in from 20–70 percent, by volume in total solution, of a liquid which is a solvent for said vinyl aromatic compounds, casting said solution with a reinforcing material therein to a membrane form having at least two dimensions in excess of 0.25 inch, polymerizing the solute under conditions preventive of the escape of solvent to form a solid coherent uniform gel, haloalkylating the gel, and treating the haloalkylated gel with a tertiary aliphatic amine while retaining substantially the same solvent concentration.

7. The method of forming a solid anion-permeable unfractured structure of quaternization products of chloromethylated aromatic vinyl polymers, said structure having at least two dimensions in excess of 0.25 inch which includes the steps of dissolving divinyl benzene and at least one compound of the group consisting of styrene, the alpha substituted alkyl derivatives thereof, and the nuclearly substituted alkyl derivatives thereof, in the proportion of from 20–100 mol percent divinyl benzene, in from 20–70 percent, by volume on total solution of a liquid which is a solvent for said vinyl aromatic compounds, casting said solution with a reinforcing sheet material therein to a membrane form having at least two dimensions in excess of 0.25 inch, polymerizing the solute under conditions preventive of the escape of solvent to form a solid coherent uniform gel, chloromethylating the gel, and treating the chloromethylated gel with a tertiary aliphatic amine while retaining substantially the same solvent concentration.

8. As an article of manufacture a solid, insoluble, infusible, unfractured structure in the form of a sheet or membrane consisting essentially of a coherent homogeneous matrix of a quaternization polymerizate of polyvinyl and monovinyl aromatic compounds; in gel relationship with at least 20 percent by volume of an aqueous soluting liquid which presents a continuous phase throughout said gel, said membrane being a selectively anion permeable and electrically conductive solid homogeneous structure.

9. As an article of manufacture, a solid unfractured anion-exchange structure having two dimensions each in excess of 0.25 inch, and consisting essentially of a substantially insoluble, infusible homogeneous polymeric matrix containing mono-and polyvinyl aromatic groups and having dissociable quaternary ammonium groups bound to the aromatic nuclei, in gel relationship with about 20 to about 70 percent of an aqueous solvating liquid, by volume on total volume, said liquid presenting a continuous phase throughout said gel, and having a reinforcing sheet material therein.

10. The method of transferring anions from one solution to another to the substantial exclusion of the transfer of cations, comprising separating the solutions by a solid, insoluble, unfractured continuous barrier having at least two dimensions each in excess of 0.25 inch, said barrier consisting essentially of an insoluble infusible homogeneneous polymerizate of mono- and polyvinyl aromatic groups and having dissociable quaternary ammonium groups bound to the aromatic nuclei in gel relationship with about 20 to about 70 percent of an aqueous solvating liquid, by volume based on total volume of the barrier as a continuous phase, and passing a direct electric current through said solutions and barrier in series thus effecting migration of said anions through said barrier.

11. The method of transferring anions from one solution to another to the substantial exclusion of the transfer of cations, comprising separating the solutions by a solid homogeneous insoluble unfractured continuous barrier having at least two dimensions each in excess of 0.25 inch, consisting essentially of quaternization derivatives of a homogeneous haloalkylated mono- and polyvinyl aromatic polymerizate in gel relationship with from about 20 to 70 percent by volume of an aqueous solvating liquid as a continuous phase, said polymerizate being imbedded in a reinforcing sheet material, and passing a direct electric current through said solutions and barrier in series thus effecting migration of said anions through said barrier.

References Cited in the file of this patent

UNITED STATES PATENTS

| 2,378,196 | D'Alelio | June 12, 1945 |
| 2,591,574 | McBurney | Apr. 1, 1952 |
| 2,597,439 | Bodamer | May 20, 1952 |
| 2,609,341 | Juda | Sept. 2, 1952 |
| 2,636,652 | Juda et al. | Apr. 28, 1953 |
| 2,636,851 | Juda et al. | Apr. 28, 1953 |
| 2,681,319 | Bodamer | June 15, 1954 |